US008386233B2

(12) United States Patent
Khuda

(10) Patent No.: US 8,386,233 B2
(45) Date of Patent: Feb. 26, 2013

(54) ELECTRONIC MULTI-LANGUAGE-TO-MULTI-LANGUAGE TRANSLATION METHOD AND SYSTEM

(75) Inventor: Khaled R. Khuda, Altamonte Springs, FL (US)

(73) Assignee: Exling, LLC, Altamonte Springs, FL (US)

( * ) Notice: Subject to any disclaimer, the term of this patent is extended or adjusted under 35 U.S.C. 154(b) by 315 days.

(21) Appl. No.: 12/781,010

(22) Filed: May 17, 2010

(65) Prior Publication Data

US 2011/0282645 A1 Nov. 17, 2011

Related U.S. Application Data

(60) Provisional application No. 61/334,227, filed on May 13, 2010.

(51) Int. Cl.
*G06F 17/28* (2006.01)
(52) U.S. Cl. ..................... 704/3; 704/2; 704/7
(58) Field of Classification Search .......... 704/2–8
See application file for complete search history.

(56) References Cited

U.S. PATENT DOCUMENTS

| | | | | |
|---|---|---|---|---|
| 5,715,466 A | * | 2/1998 | Flanagan et al. | 704/5 |
| 5,884,246 A | * | 3/1999 | Boucher et al. | 704/2 |
| 5,987,401 A | * | 11/1999 | Trudeau | 704/2 |
| 6,092,035 A | * | 7/2000 | Kurachi et al. | 704/3 |
| 6,161,082 A | * | 12/2000 | Goldberg et al. | 704/3 |
| 6,898,623 B1 | * | 5/2005 | Williams et al. | 709/206 |
| 6,912,519 B2 | * | 6/2005 | Shouji | 709/206 |
| 7,185,059 B2 | * | 2/2007 | Daniell et al. | 709/206 |
| 2002/0169592 A1 | * | 11/2002 | Aityan | 704/2 |
| 2006/0133585 A1 | * | 6/2006 | Daigle et al. | 379/88.06 |
| 2008/0195372 A1 | * | 8/2008 | Chin et al. | 704/2 |

OTHER PUBLICATIONS

Google AJAX APIs. http://code.google.com/p/google-ajax-apis/issues/detail?id=273, accessed Apr. 6, 2010.*

* cited by examiner

*Primary Examiner* — Jesse Pullias
(74) *Attorney, Agent, or Firm* — McKinney Law, PLLC

(57) ABSTRACT

An electronic multi-language-to-multi-language translation method and system is disclosed. The system includes a first user to communicate in a first language, a server, where the first user and the server are in communication, a second user to communicate in a second language, and a translation engine on a remote server. A message in the first language is transmitted by the first user to the second user via the server, where the message is forwarded to the translation engine to translate the message to the second language and transmit a translated message back to the second user for display. The message may be forwarded to the translation engine by a local application of the second user. In addition, the system may include a database in communication with the server to store the user's profile to identify the preferred language of the user. The message may be stored by the database.

20 Claims, 5 Drawing Sheets

ELECTRONIC MULTI-LANGUAGE-TO-MULTI-LANGUAGE TRANSLATION METHOD AND SYSTEM

I. CROSS-REFERENCE TO RELATED APPLICATIONS

This application claims the benefit of U.S. Provisional Application No. 61/334,227 filed May 13, 2010. The disclosure of the provisional application is incorporated herein by reference.

II. FIELD

The present disclosure is generally related to an electronic multi-language-to-multi-language translation method and system using a client server network structure for social networking services including, but not limited to, chatting, blogging, email, SMS, news, commenting and micro-blogging.

III. DESCRIPTION OF RELATED ART

Currently, there are several designs that show common computer-to-computer architecture as the device structure for electronic language translation of data. The designs may include resolving the language to language (L2L) translation process over the Internet or a network. A few examples of L2L translations may include U.S. Pat. Nos. 5,987,401, 6,092,035, and 6,161,082. A shortcoming of the prior art is that the user is required to manually manage the user's language each time a different platform is accessed.

Further, there may be particular parameters that need to accompany the data to assist the L2L translation. These parameters may include identifying the source and destination languages, recipient information, and a field of text for purpose of translation. It is also may be necessary to determine if the source text is in need of translation initially by comparing the source and recipient languages. Hence, there is a need in the art for a method and system that associates a user's parameters with a user identification and password so that once the user logs into the network, all content is tailored to their language with no manual setting of language across multiple platforms.

However, in view of the prior art at the time the present invention was made, it was not obvious to those of ordinary skill in the pertinent art how the identified needs could be fulfilled.

IV. SUMMARY

In a particular embodiment, an electronic multi-language-to-multi-language translation system is disclosed. The system includes a first user to communicate in a first language, a server, where the first user and the server are in communication, a second user to communicate in a second language, and a translation engine on a remote server. A message in the first language is transmitted by the first user to the second user via the server, where the message is forwarded to the translation engine to translate the message to the second language and transmit a translated message back to the second user for display. The message may be forwarded to the translation engine by a local application of the second user. In addition, the system may include a database in communication with the server to store the user's profile to identify the preferred language of the user. The message may be stored by the database.

In another particular illustrative embodiment, the server interrogates the database for the second user profile and the server retrieves the message and the second user profile. The message is forwarded by the server to the translation engine, which transmits the translated message back to the server, and the server transmits the translated message to the second user for display. The first user or the second user may communicate with the server using a personal computer or an electronic cellular device.

In a particular illustrative embodiment, the electronic multi-language-to-multi-language translation system includes an email server and the message is an email message. The email message may be broken into a plurality of blocks before transmitting to the translation engine when the maximum size of email message is exceeded. The email message that is forwarded to the translation engine is transmitted back to the server and the server transmits the translated email message to the email server. In addition, the system includes a third party email server to receive the translated email message and to forward the translated email message to the second user via the third party email server.

In another particular illustrative embodiment, an electronic multi-language-to-multi-language translation system includes a news request from a user, a server, where the user and the server are in communication, a database in communication with the server, a user profile to identify a first language of the user, where the user profile is stored by the database. Further, the system includes a news source, where the server fetches a news story in a second language from the news source in response to the news request, the news story is indexed by a source link unique identifier so that user comments are possible by all users in all languages, and a translation engine on a remote server, where the server transmits the news story to the translation engine to translate the news story to the first language and transmit the translated news story back to the user for display. The news story may be broken into a plurality of blocks before transmitting to the translation engine when the maximum size of the news story is exceeded.

In another particular illustrative embodiment, an electronic multi-language-to-multi-language translation method is disclosed. The method includes accessing a server by a first user in a first language, transmitting a message in the first language to a second user via the server, forwarding the message to a translation engine to translate the message to a second language of the second user, and transmitting a translated message back to the second user for display. The method may include using a local application of the second user to forward the message to the translation engine for translation or using the server to forward the message to the translation engine. The second language of the second user may be retrieved from a database and the server may be used to transmit the translated message to the second user for display. In addition, the method may include transmitting the translated message from the translation engine back to the server and forwarding the translated message from the server to an email server, where the email server transmits the translated message to a third party email server that transmits the translated message to the second user.

The method may also include fetching a news story in the second language from a news source in response to a news request by the first user, where the news story is indexed by a source link unique identifier so that user comments are possible by all users in all languages, translating the news story to the first language using a remote translation engine, and transmitting the translated news story back to the user via the server for display.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
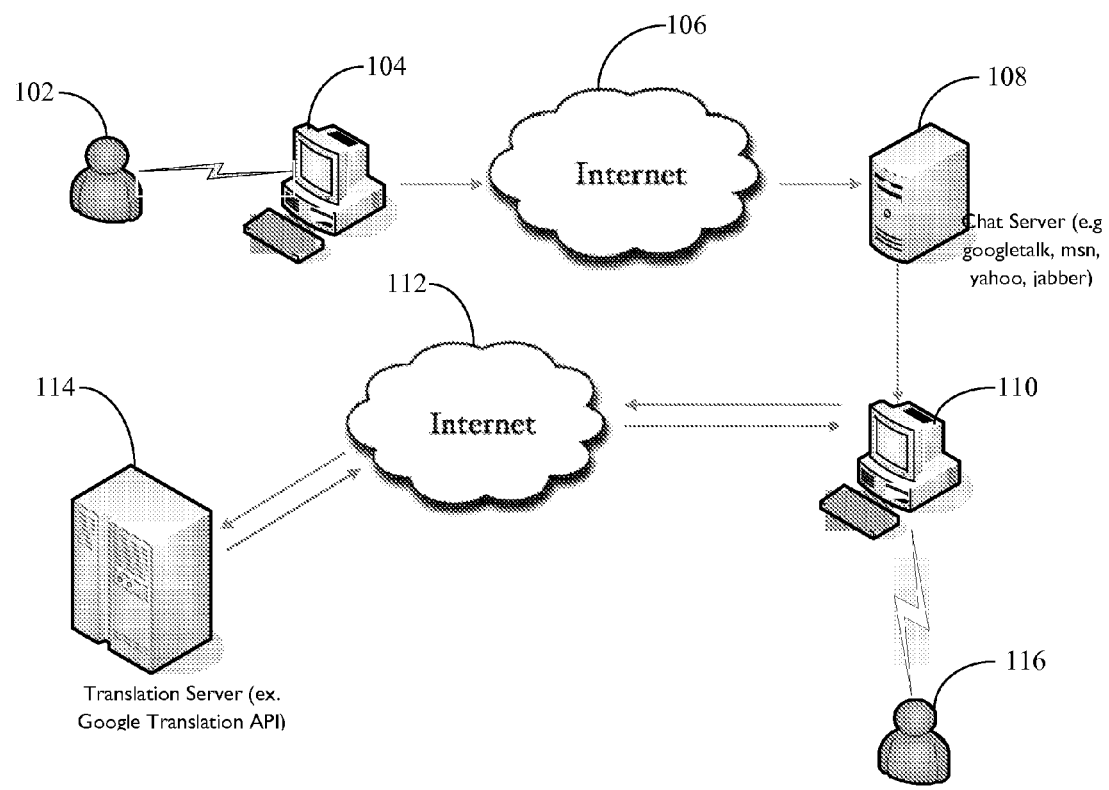
FIG. 1 is a diagram of a particular illustrative embodiment of an electronic multi-language-to-multi-language translation method and system for communication chatting.

The electronic multi-language-to-multi-language translation method and system includes user-initiated communication and user-posted information over a communication network. Language settings are stored and accessed by a username and a password protected profile of the network. As a result, web-based processes are independent of operating systems or devices, so that mobile devices, laptops and desktops alike are capable to use these services. Some types of communication methods and translation application programming interface (API) technologies are currently available, but the new and additional functionality and processes of the electronic multi-language-to-multi-language translation method and system described herein include settings to manage the user's language settings that are associated with the user ID and password. Once the user logs into the network, the content is tailored to the user's language and no manual setting of language is needed to be repeatedly asked of once the user is defined. The content, however, is user-initiated so if the user chats with another user, the user initiates the content or receives the content which is initiated by another user. Each user's profile is used to set the source and destination languages, respectively. If the user chooses to read a blog of another user, that is not their language in source profile, then the entry would be translated and served to the user in their language, and similar for news and other features. All content on the site would act accordingly as requested. The end-result of this process is a profiled user may communicate seamlessly on multiple platforms, obtain information sources across borders and language barriers, and communicate with other users outside their normal verbal skills, in their own native language.

The term automatic is used herein to define a one-time programmable, configured, or environment variable that is user-defined and stored in a user profile. Content served to and from a server is not automated to allow all users to have control on which content is initiated to their webpage. The term electronic is used herein in the form of a file, web protocol, or similar electronic data medium that data or text may be serviced to a computing system. The term Language-to-Language (L2L) Translation is described herein as process of receiving a user text input in a first language and outputting a text in a second language. This is not limited to two users, but can be applied to any single sender and any number of recipients. Each pair of languages and settings would consist of a transaction through this process. The term Client-Server Network Structure is used herein to define a network of computing client systems linked by a Server and Server database. The term Networking, or Network is used herein to describe a website constructed to allow a user login and password, rights and permissions, settings, and other content to be chronicled, communication via blog, micro-blog, email, and chat from user to user. This networking may initially be released as social networking for user-initiated content, but the process should not be limited to this function in scope. User Profile Parameters may include, but are not limited to:

Gender: Some languages require differences when speaking to a male vs. female;

Age: Some languages use specific tone or word choice when speaking to an elder or a child. Age is required to compare if the user is older/younger electronically; and Language and Dialect: Not only for setting the proper font set and user environment of the program, but for confirming which dialect of a language you are using. Translations or phrasing for a specific dialect may be different. These settings must be transferred for this purpose and to set the source and destination languages to operate automatically rather than manually.

The term Environmentally Set Profile is used herein to define a set of parameters set by the environment context of the discussion that is specific and necessary for a proper translation model. These may include, but are not limited to, Plurality: A translation when speaking to a number of people versus a single person may vary by language. The environment can try to improve on this model if a person is copying multiple recipients in a message or is Instant Messaging with a multiple users;

Formality: A setting that can be deduced by the nature of the communication platform. A program can have a business license versus an individual license, so this parameter can set the sending tone formality to translation more professionally. A translation to informally ask "How are you?" versus "What's up?" Also, this setting could be contextually set by other formality used in the original phrasing; and Static content: Content that is static and common to the site or information hosted by the site that can be indexed with a single translation manually by the host from a database. For example, the title of a page may be static for all users of the same language. This content is one-time translated and static in nature. It is part of the environment and not the dynamic content shared by users.

The term Common Sense is used when a specific component is a common sense attribute that is not a specific dynamic of the process, but must be clarified to describe the process in whole.

One advantage of the invention is that it requires only a one-time programmable setting. Instant Messaging in the same language exists and can be excluded, but L2L instant messaging repeatedly from a variety of users may be difficult to configure each session or message, especially on first-time communication. The electronic multi-language-to-multi-language translation method and system is specific and unique in overall automatic function, process, and methodology for storing the profile and settings, as well as structure and environment that will serve the content to multiple users.

The electronic multi-language-to-multi-language translation method and system may include the translation itself or process for L2L translation. Alternatively, the method and system may assume the use of a translation API, which would be available to the market. The electronic multi-language-to-multi-language translation method and system may use, for example, commonly-known services like Google. For implementation on a product, this should not be assumed or limited to this provider. The translation API is generalized. The electronic multi-language-to-multi-language translation method and system described may operate with specific minimum parameters suited for definition and process, but more complex parameters in this process may be assumed for application.

The device connection for this implementation may be over a network in a client-server architecture such that two (2) or more client computers are engaging in communications and are linked via a common server hosting. For example, a user may go to the electronic multi-language-to-multi-language translation method and system website via the Internet and request an account profile. This process allows for the user to create a Username & Password. With this service login account the user may begin to establish and configure service account details. At minimum, this will have some security parameters, require a terms of use agreement, and specify a variety of parameters about the user that are essential to the accuracy and function of electronic multi-language-to-multi-language translation method and system.

A user account profile may include, but is not limited to, the native language and dialect of the user (for example, English-United States), their gender (male/female), and their age at the time of account creation. These parameters are required for some specific L2L translations for sake of example, but other environmental and settings could be added to improve the resulting quality. It is implied that this type of information is stored in a database by user profile, and for sake of example, these are the types of criteria chronicled.

The user may then login repeatedly and these settings will be applied. They may also enter a settings page to later make adjustments to these settings. The user may then through the site engage in a conversation with one or more other users.

With all client programs initialized and profiled, a multilingual communication or content may be accessed. The user can then access any user's content (comments, blog, microblog, chat, email) as the recipient and view the content in their own language if they initiate an interest to view that content. A user in this session can begin to communicate in their native language with others also, even if they speak other languages.

For example, if a post by a user or instant message occurred, it may process as follows:
1. User #1 may type "您好吗"
2. The method and system will pull from the profile of User #1 that their communication language is Mandarin Chinese.
3. The setting for the destination user (User #2) is retrieved from the database that this user is set to communicate in English. Since this is not the source language (inequality of settings between users), the server will seek a L2L translation.
4. The result is that the translation may return "how are you?" The translation may vary based on the API used, but this is for the sake of example. Then User #2 will receive this content in English.

The method and system will vary based upon the type of communication. Each method and system below will be described accordingly and a diagram to show the logic flow will be noted.

Referring now to FIG. 1, a particular illustrative embodiment of an electronic multi-language-to-multi-language translation method and system for communication chatting is disclosed. The desktop chatting application is installed locally on the originating user's 102 and destination user's 116 machines 104, 110, respectively, for the translation to take effect. A chat message is sent to the chat server 108 (e.g., msn, yahoo, jabber) over an Internet connection 106. The chat server 108 recognizes which friend (e.g., destination user) to send the message to and hence sends the message to the destination user's machine 110. The application running on the destination user's machine 110 receives the message and sends it to the translation API 114 (such as Google translation engine) over an Internet connection 112 for translation. The translation engine translates the messages and sends them back to the destination user's machine 110 where the desktop application is running He/she 116 then receives the translated message in his/her language where it is displayed.

In the illustrative embodiments described above and below, the server may have two servers running for hosting two different applications; one may be professional and social community site and the other may be a mobile community site. The professional and social community site may be running on an Apache server whereas the mobile community site may be running on a Tomcat 6 servlet container. The database server may also be hosted on the same machine and may use a MySQL database.

Figure 2:
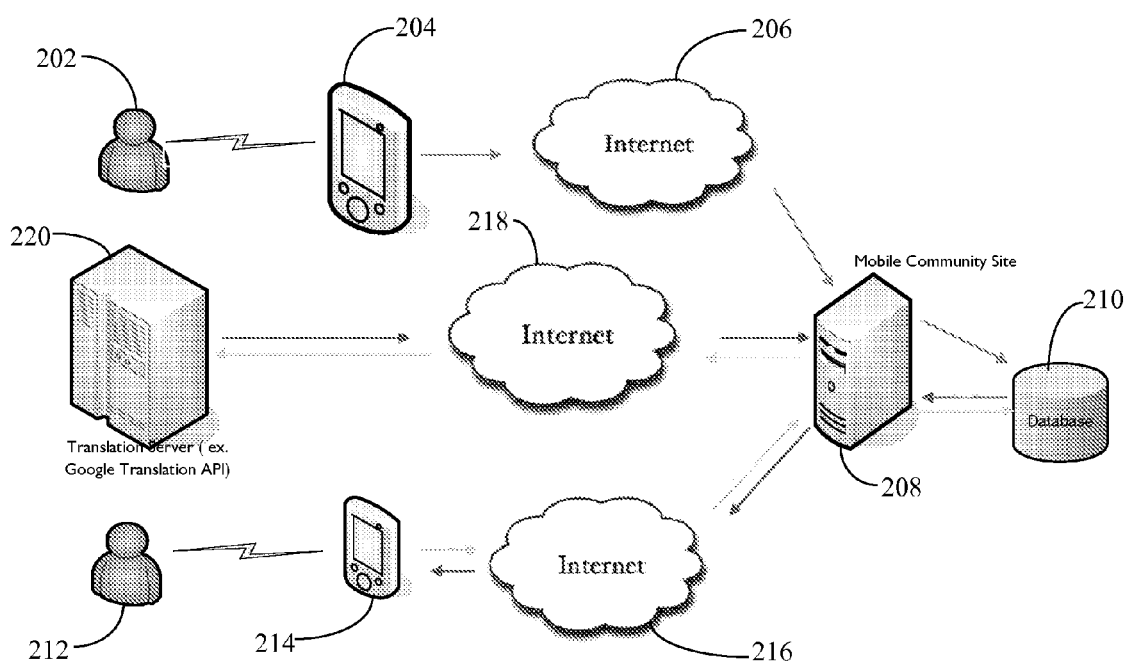
FIG. 2 is a diagram of a particular illustrative embodiment of an electronic multi-language-to-multi-language translation method and system for mobile messaging.

Referring now to FIG. 2, a particular illustrative embodiment of an electronic multi-language-to-multi-language translation method and system for mobile messaging is disclosed. The client 202 logs into the mobile community site using a mobile device 204 over an Internet connection 206 and uses the personal message feature to write a message and send it to a friend 212 (destination user). The message is then sent to the application server 208 where the application is hosted. The message is stored in the database 210 against the destination user's userid. The destination user 212 requests for any new messages that are sent to him to the application server 208. The application server 208 retrieves the messages as well as the destination user's language from the database 210. The messages are then sent to translation engine API 220 (a service provided by companies such as Google Translation) over an Internet connection 218 for translating it to the destination user's language. The translated messages are sent back to the application server 208. The application server 208 sends the translated message to the destination user 212 over an Internet connection 216 who requested any new messages that were sent to him by the client 202. The destination user 212 views the message in his/her own language on the mobile device 214.

Figure 3:
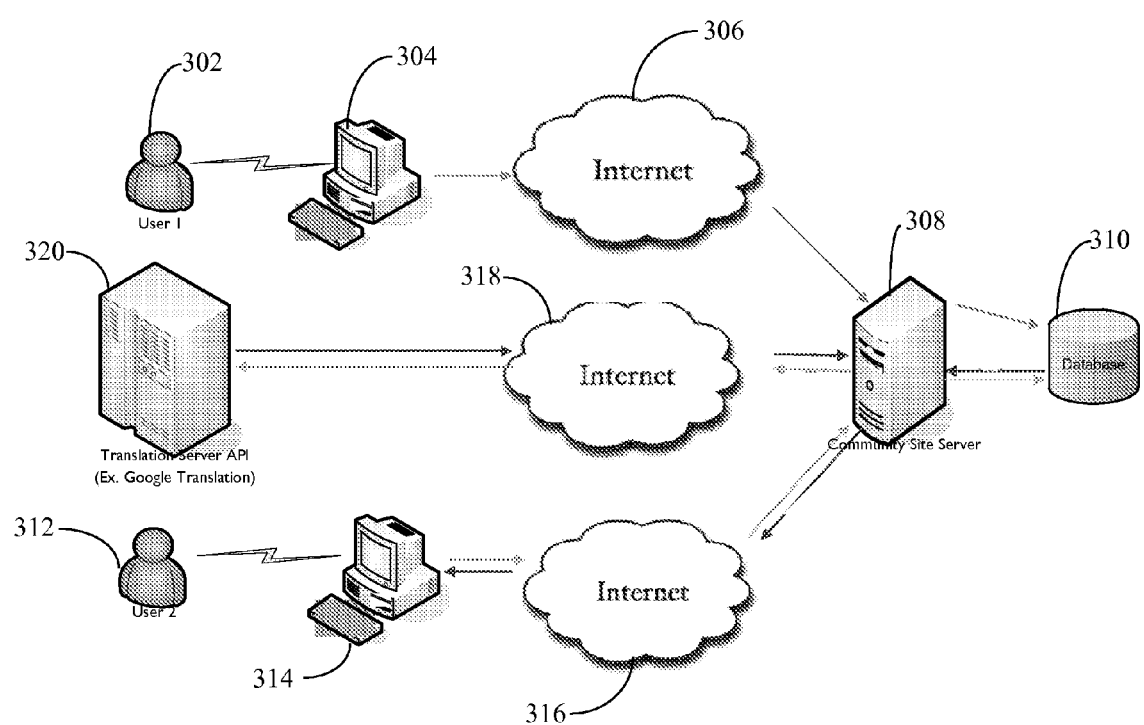
FIG. 3 is a diagram of a particular illustrative embodiment of an electronic multi-language-to-multi-language translation method and system for website chatting.

Referring now to FIG. 3, a particular illustrative embodiment of an electronic multi-language-to-multi-language translation method and system for website chatting is disclosed. The first user 202 (chat initiator), who intends to send a message to a second user 312, sends a request using his/her machine 304 where the request includes his/her user id, the recipient's user id, the first user language and the message, to the community site server 308 over an Internet connection 306. The server 308 stores the data sent by the first user 302 into a database 310. The second user 312 uses his/her machine 314 to connect to the community site server 308 using an Internet connection 316. The server 308 checks the database 310 for updates on the second user 312. The server 308 retrieves the message information from the database 310 along with the second user's 312 language. The server 308 then sends the message along with the first user's 302 and second user's 312 language to the translation server API 320 (a provider such as Google Translation) for translation. The translation server 320 returns the translated message to the community site server 308, where the server 308 returns the translated message to the second user 312.

Figure 4:
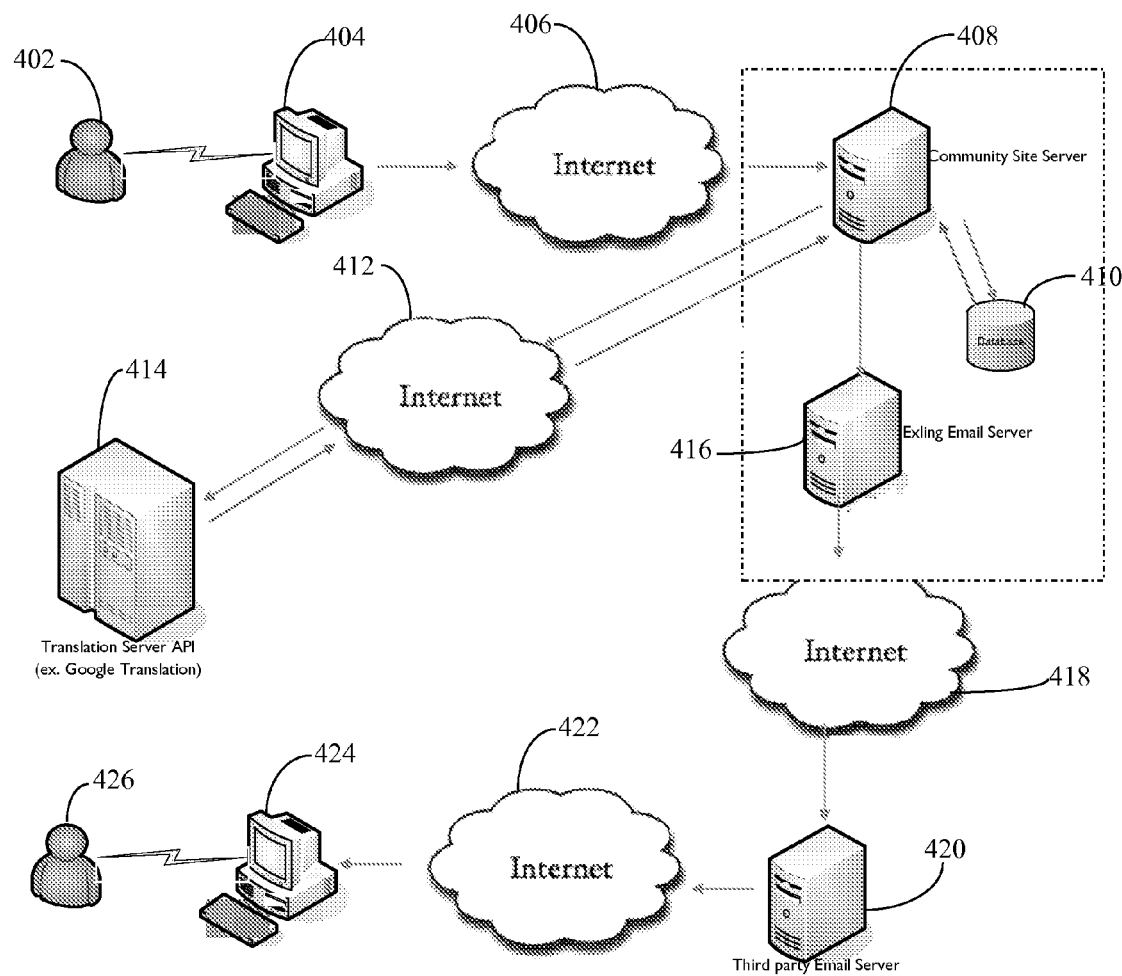
FIG. 4 is a diagram of a particular illustrative embodiment of an electronic multi-language-to-multi-language translation method and system for email.

Referring now to FIG. 4, a particular illustrative embodiment of a particular illustrative embodiment of an electronic multi-language-to-multi-language translation method and system for email is disclosed. For example, the client 402 writes an email on his machine 404 and sends it to the destination address over an Internet connection 406. The request is sent to the application server 408 with the email body and the destination user's 426 email address. The server 408 then retrieves the destination user's language using the email address. The application server 408 may break the email body into chunks of messages containing a set number of characters, such as 1200 characters to comply with the translation API specifications. Some translation engine APIs do not put limits on the translation block size, however if the API requires compliance, then the method and system may include this feature. The application server 408 sends the request to the translation engine (e.g., Google Translation), over an Internet connection 412 which is hosted by the API's server 414, containing the 1200 characters for translation. The application server 408 may send multiple such requests based on the number of 1200-character chunks. Each of the chunks of messages is translated by the translation engine and is sent back to the application server 408. Once all the chunks are translated, they are put together into once continuous email message and sent to the email server 416. The email server 416 resolves who to send the message to and forwards the email to the destination email server 420 using simple mail transfer protocol. For example, if the email is sent from john@exling.com to jack@gmail.com, the email server 416 would forward the email to a gmail server 420. The third party email server 420 (e.g., gmail) determines who the email is destined for and then sends the email to the end user's machine 424 over an Internet connection 422. The user 426, then, gets the email in his language.

Figure 5:
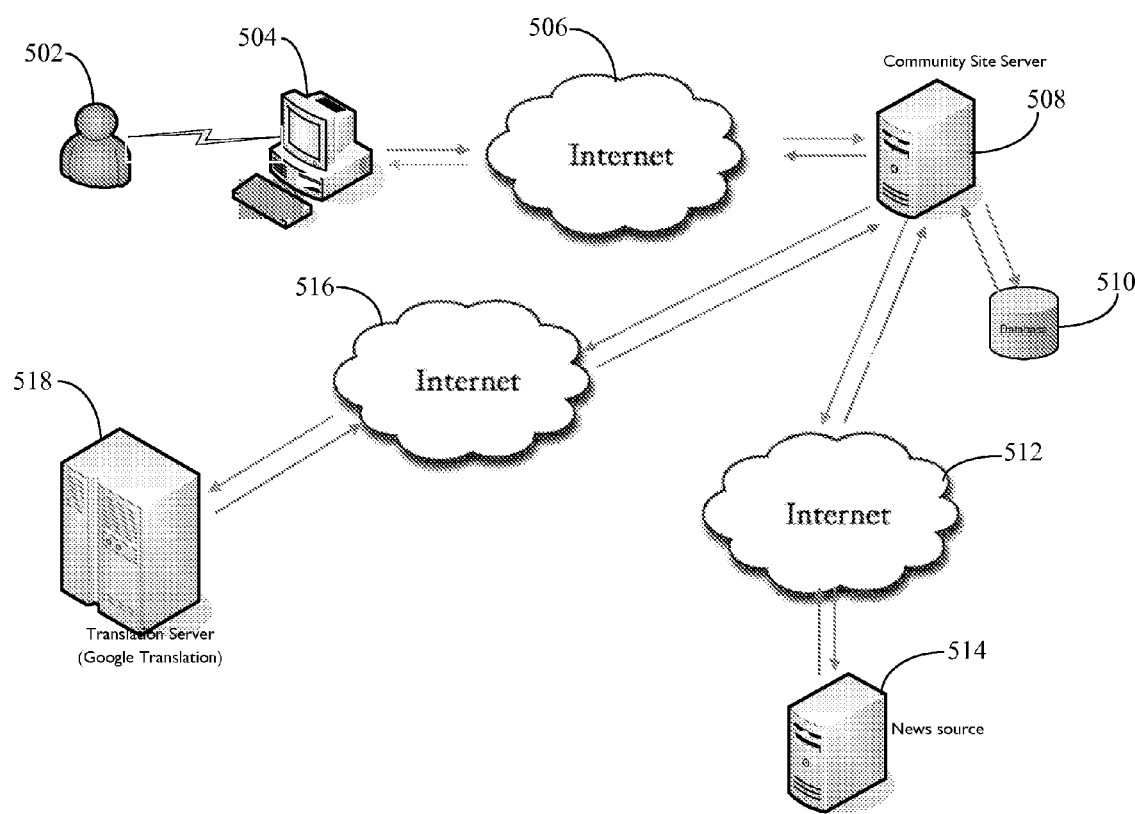
FIG. 5 is a diagram of a particular illustrative embodiment of an electronic multi-language-to-multi-language translation method and system for RSS news feed translation.

Referring now to FIG. 5, a particular illustrative embodiment of an electronic multi-language-to-multi-language translation method and system for RSS news feed translation is disclosed. The user 502 uses his/her machine 504 to sign in to the professional community site 508 over an Internet connection 506 and makes a request for News content from a given source, which means that a request to the application server is sent for all the news to appear on the home page. The application server 508 retrieves the language of the user 502 requesting for the news from the database 510. The application server 508 locates the news source 514, which is predefined, and fetches the news from the RSS feed provided by the news source 514 over an Internet connection 512. The news is then indexed by source link by a unique identifier for each of the news stories so that user comments will be possible by all users in all languages. The application server 508, then, retrieves the news from the database and sends to the translation engine 518 for translation over an Internet connection 516. The entire news block may not be sent for translation, rather the news may be broken into a brief synopsis of the story and the headline only to improve performance, then with a click by the user 502 processes the full story. The API used in this process may require the story to be broken into blocks of text due to the limits of the API's translation block, so the story may require to be broken into sections, translated, then reassembled by the application server 508 in some situations. The application server 508, then, organizes the chunks of data into one complete full news story that is displayed to the client 502.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope possible consistent with the principles and novel features as defined herein.

What is claimed is:

1. An electronic multi-language-to-multi-language translation system, the system comprising:
 a first user to communicate in a first language;
 a server, wherein the first user and the server are in communication;
 a second user to communicate in a second language;
 a translation engine on a remote server; and
 an email message in the first language transmitted by the first user to the second user via the server, wherein the email message is forwarded to the translation engine by the server to translate the email message to the second language and transmit a translated email message to the second user for display;
 wherein the email message is broken into a plurality of blocks before transmitting each block to the translation engine as a translation request when the email message size exceeds a maximum compliant number of characters for the translation engine, and after all the blocks are translated, the blocks are put together into a continuous email message and sent to an email server.

2. The electronic multi-language-to-multi-language translation system of claim 1, wherein the first user communicates in the first language using a local application.

3. The electronic multi-language-to-multi-language translation system of claim 2, wherein the second user communicates in the second language using the local application.

4. The electronic multi-language-to-multi-language translation system of claim 1, further comprising a database in communication with the server.

5. The electronic multi-language-to-multi-language translation system of claim 4, further comprising a first user profile to identify the first language of the first user, wherein the first user profile is stored by the database.

6. The electronic multi-language-to-multi-language translation system of claim 5, further comprising a second user profile to identify the second language of the second user, wherein the second user profile is stored by the database.

7. The electronic multi-language-to-multi-language translation system of claim 6, wherein the email message is stored by the database.

8. The electronic multi-language-to-multi-language translation system of claim 7, wherein the server interrogates the database for the second user profile.

9. The electronic multi-language-to-multi-language translation system of claim 8, wherein the server retrieves the email message and the second user profile.

10. The electronic multi-language-to-multi-language translation system of claim 9, wherein the first user or the second user communicate with the server using a personal computer.

11. The electronic multi-language-to-multi-language translation system of claim 9, wherein the first user or the second user communicate with the server using an electronic cellular device.

12. The electronic multi-language-to-multi-language translation system of claim 9, wherein the email message forwarded to the translation engine is transmitted back to the server and the server transmits the translated email message to the email server.

13. The electronic multi-language-to-multi-language translation system of claim 12, further comprising a third party email server to receive the translated email message and to forward the translated email message to the second user via the third party email server.

14. An electronic multi-language-to-multi-language translation system, the system comprising:
   a news request from a first user communicating in a first language;
   a second user to communicate in a second language;
   a news server, wherein the user and the news server are in communication;
   an email server, wherein the first user and the email server are in communication;
   a database in communication with the news server;
   a user profile to identify a first language of the user, wherein the user profile is stored by the database;
   a news source, wherein the news server fetches a news story in a second language from the news source in response to the news request, and the news story is indexed by a source link unique identifier so that user comments are possible by all users in all languages;
   a translation engine on a remote server, wherein the news server transmits the news story to the translation engine to translate the news story to the first language and transmit the translated news story to the first user for display; and
   an email message in the first language transmitted by the first user to the second user via the email server, wherein the email message is forwarded to the translation engine by the email server to translate the email message to the second language and transmit a translated email message to the second user for display;
   wherein the email message is broken into a plurality of blocks before transmitting each block to the translation engine as a translation request when the email message size exceeds a maximum compliant number of characters for the translation engine, and after all the blocks are translated, the blocks are put together into a continuous email message and sent to the email server.

15. The electronic multi-language-to-multi-language translation system of claim 14, wherein the news story is broken into a plurality of blocks before transmitting to the translation engine when a size of the news story exceeds the maximum compliant number of characters.

16. An electronic multi-language-to-multi-language translation method, the method comprising:
   accessing a server by a first user in a first language;
   transmitting an email message in the first language to a second user via the server;
   forwarding the email message to a translation engine from the server to translate the email message to a second language of the second user; and
   transmitting a translated email message to the second user for display;
   wherein the email message is broken into a plurality of blocks before transmitting each block to the translation engine as a translation request when the email message size exceeds a maximum compliant number of characters for the translation engine, and after all the blocks are translated, the blocks are put together into a continuous email message and sent to an email server.

17. The electronic multi-language-to-multi-language translation method of claim 16, further comprising using a local application of the second user to forward the email message to the translation engine for translation via the server.

18. The electronic multi-language-to-multi-language translation method of claim 16, further comprising retrieving the second language of the second user from a database and using the email server to transmit the translated email message to the second user for display.

19. The electronic multi-language-to-multi-language translation method of claim 16, further comprising: transmitting the translated email message from the translation engine back to the server; and forwarding the translated email message from the server to the email server, wherein the email server transmits the translated email message to a third party email server that transmits the translated email message to the second user.

20. The electronic multi-language-to-multi-language translation method of claim 16, further comprising: fetching a news story in the second language from a news source in response to a news request by the first user, wherein the news story is indexed by a source link unique identifier so that user comments are possible by all users in all languages; translating the news story to the first language using a remote translation engine; and transmitting the translated news story back to the user via the server for display.

* * * * *